Patented Nov. 6, 1928.

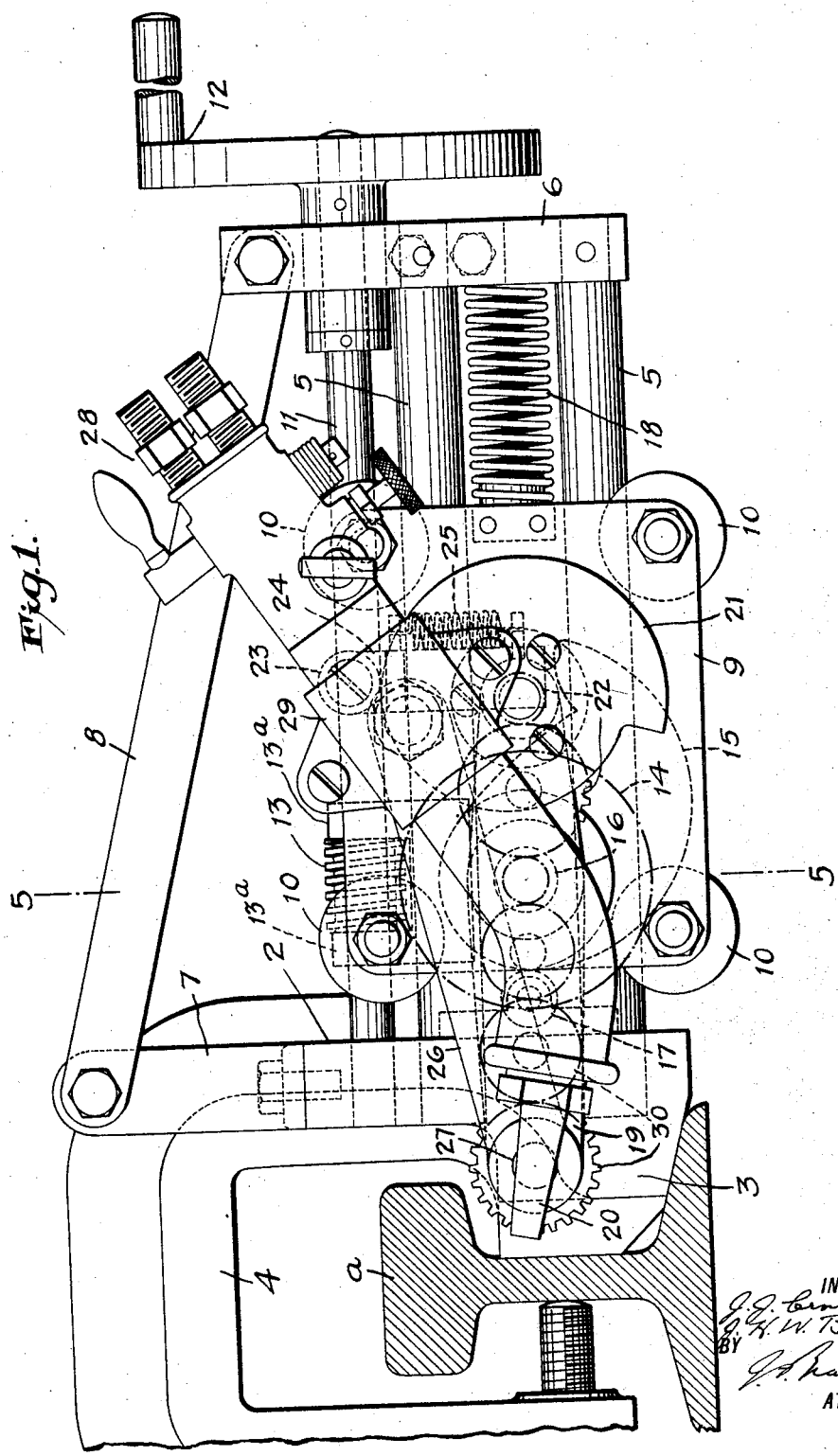

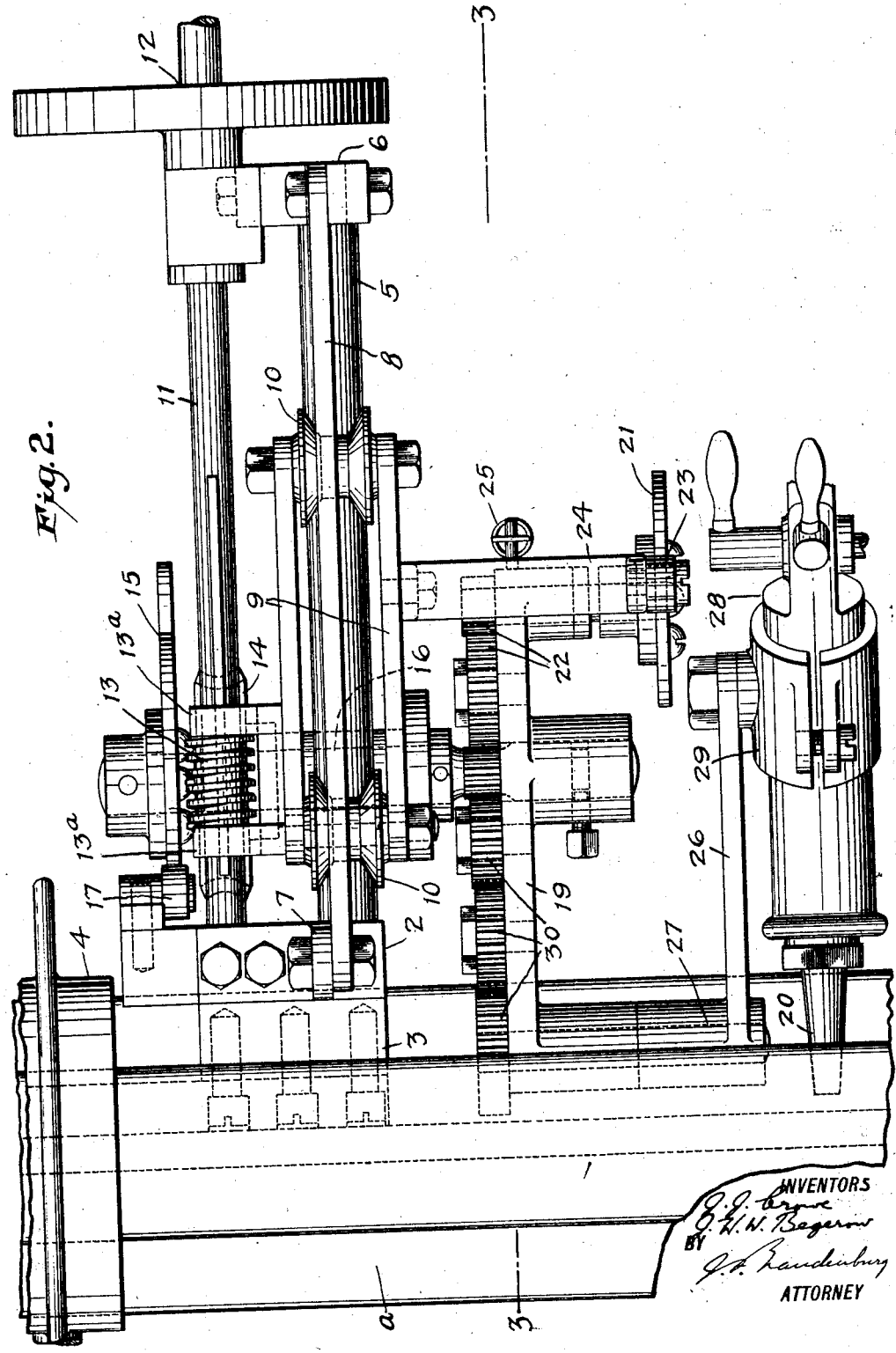

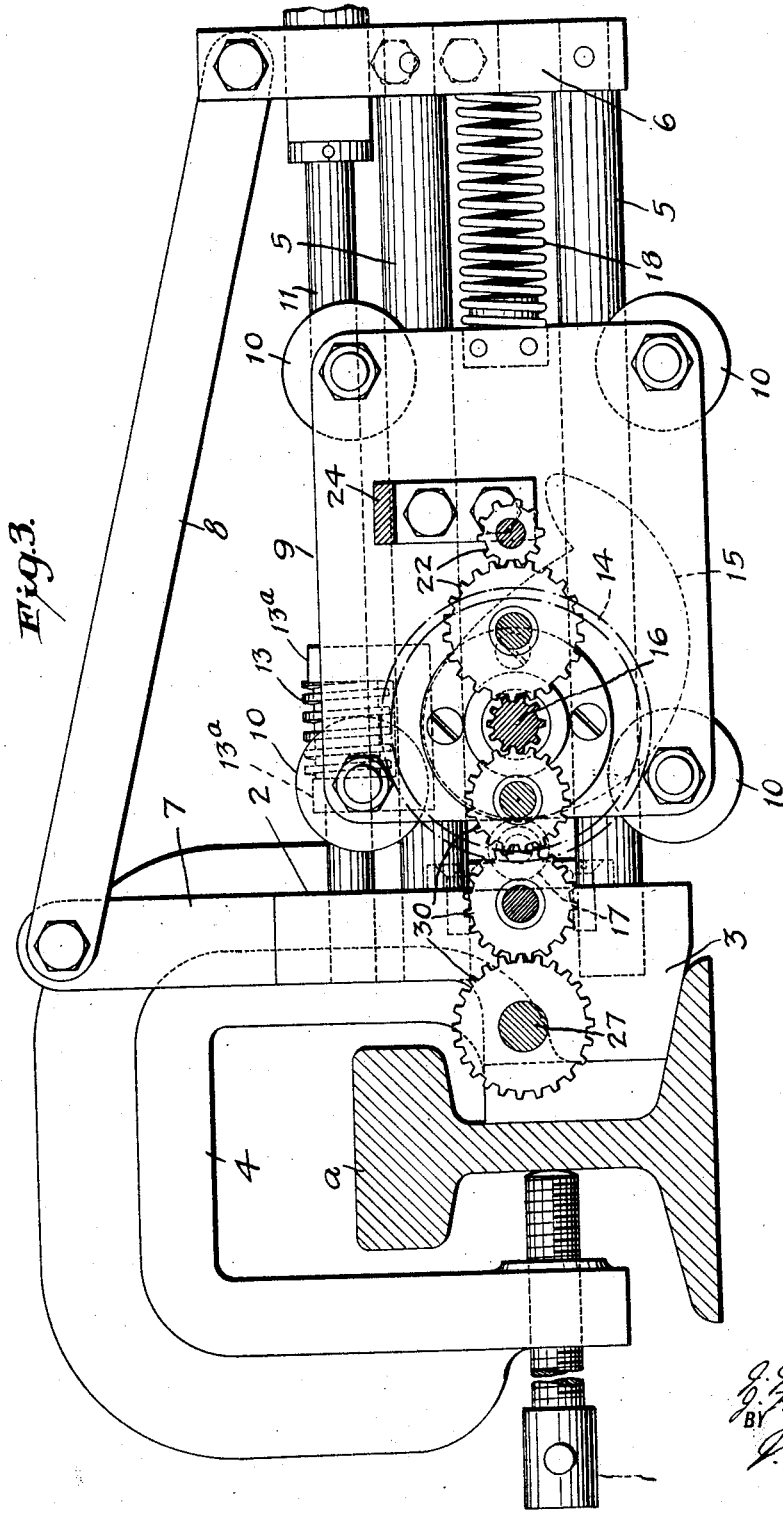

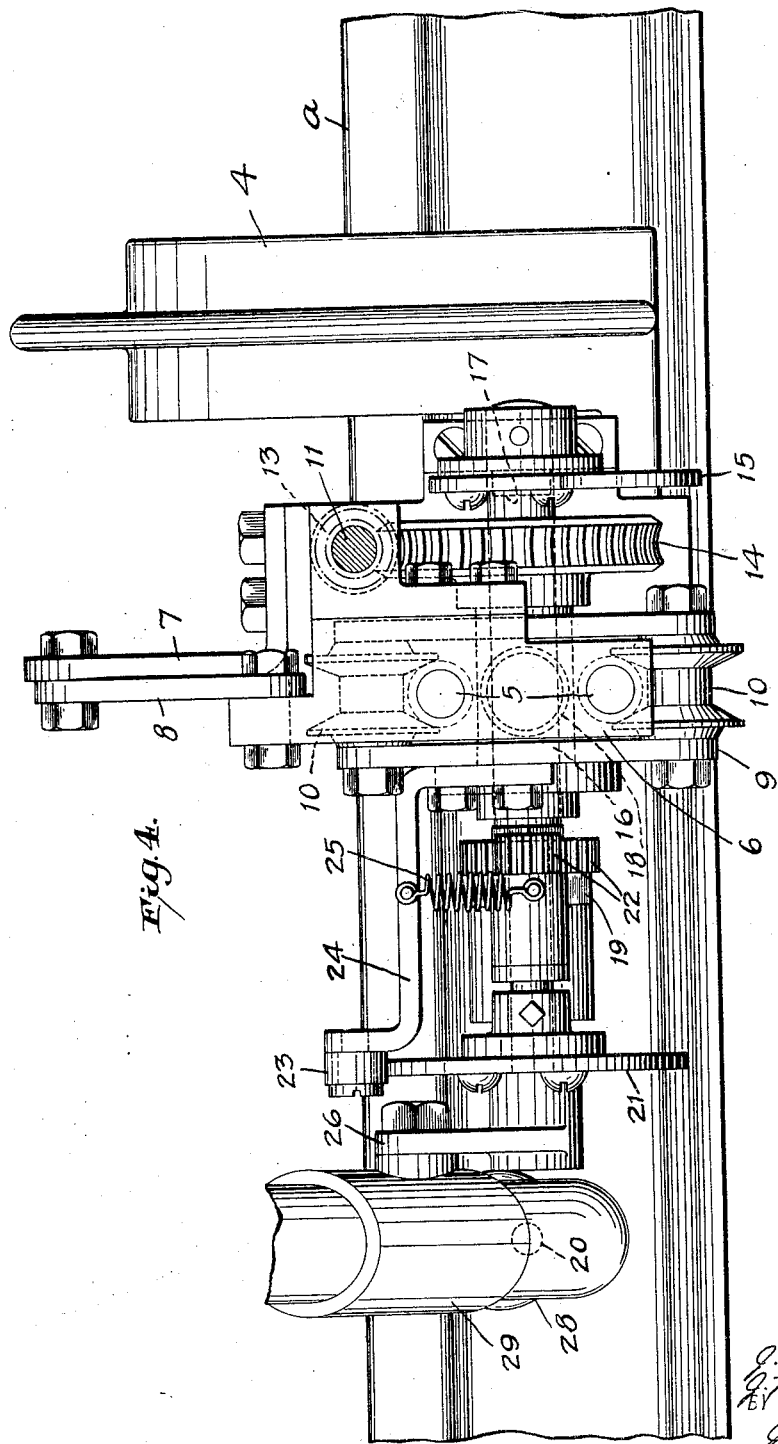

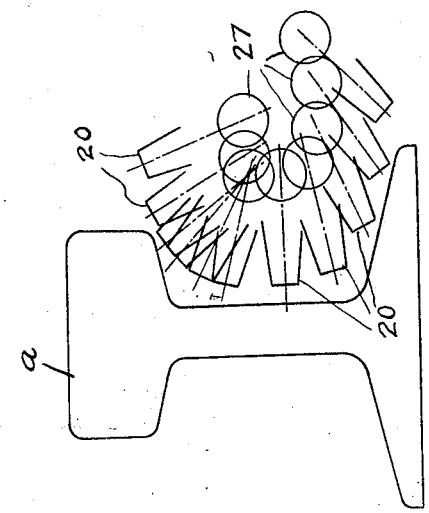
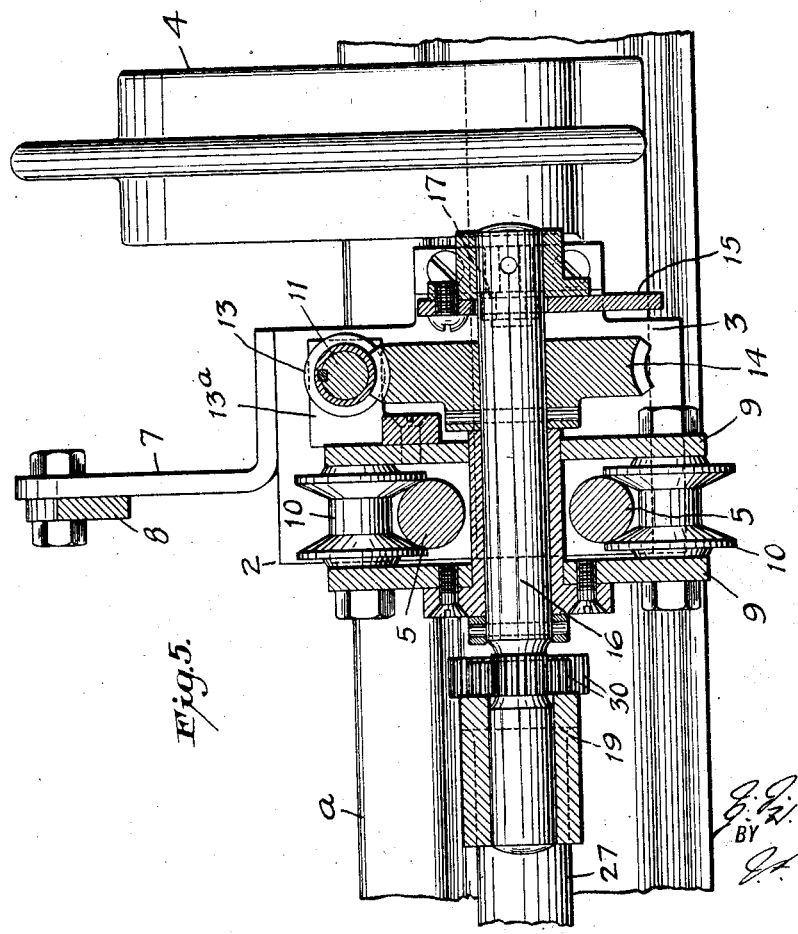

1,691,007

UNITED STATES PATENT OFFICE.

JOHN J. CROWE, OF WESTFIELD, AND JOHN H. W. BEGEROW, OF SECAUCUS, NEW JERSEY, ASSIGNORS TO AIR REDUCTION COMPANY, INCORPORATED, OF NEW YORK, N. Y., A CORPORATION OF NEW YORK.

TORCH MACHINE.

Application filed May 23, 1927. Serial No. 193,708.

The invention relates to machines and apparatus for moving and guiding oxyacetylene, oxyhydric or like torch jets over or in relation to the entrant or irregular contours of metal shapes, specifically for severing the same. The special embodiment of the invention is a machine or apparatus for cutting railroad rails, but similar mechanism can be used for cutting I-beams, channels, or other structural shapes.

The object is to provide an effective and advantageous mechanism or apparatus for such purposes, wherein the jet-delivering means is supported and guided from a frame or support in such manner as to be movable in the plane of the jets in a path of irregularly changing direction suited to the shape to be operated upon, the means for moving the jets determining or controlling the path. In the complete embodiment of the invention the torch or torch-nozzle is carried by successive movable parts or carriages capable of different movements in or parallel with a plane, in or out and up or down, the nozzle also having a turning movement in the same plane, and the extent and rate of displacement of the jets in different directions, combined or successive, is determined by moving cams or gearing which control the actual path of the jets over the irregular or entrant contour.

The embodiment of the invention herein described and to which the application is more particularly, though not necessarily exclusively directed, is a machine wherein power or motion applied manually or otherwise to a single recipient is transmitted to a plurality of mechanisms for actuating three successively carried parts, whereby the desired motions or resultants are produced at the torch nozzle, to cause it to travel in relation to the base, web and ball of a rail, for example. A particular object is to provide an efficient apparatus or machine of this character suitable for cutting a railroad rail in situ, by operating at one side only of the rail.

Other features of the invention will be apparent to those skilled in the art from the accompanying drawings and the following description.

In the accompanying drawings forming part hereof:

Fig. 1 is a side elevation of the embodiment of the machine applied to a rail, which is shown in section;

Fig. 2 is a plan view;

Fig. 3 is a section on the line 3—3 of Fig. 2;

Fig. 4 is an end elevation, the operating shaft in cross-section;

Fig. 5 is a section on the line 5—5 of Fig. 1; and

Fig. 6 is a diagrammatic view.

A frame 2 has a part 3 adapted to bear against the web and base flange of a rail $a$, and a clamp 4 for fixing it in place on the rail. The particular design of the means for securing the frame on, or positioning it in respect to, the work may be varied.

The frame illustrated has a pair of horizontal guide rods 5 extending from the part 3 at right angles to the rail, these rods being united at their outer ends to a strut 6 braced from an upwardly projecting bracket 7 on the part 3 by an inclined member 8. A slide carriage 9 provided with rollers 10 guided on the rods 5 is movable in and out toward and from the rail to be cut.

A drive shaft 11 is journaled in the main frame 2 above and parallel with the guides 5, and is provided at the outer end with a handle 12. A worm 13, retained between abutments 13$^a$ on the carriage, is splined on this shaft, so as to be movable along the same in driven relation thereto, the worm being movable endwise with the carriage.

The said worm meshes a worm-wheel 14 mounted on the carriage 9, and a rotary cam 15 secured on the same shaft or center 16 coacts with a roller 17 on the main frame so as to produce or permit rectilinear movement of the carriage. In the particular construction illustrated the movement of the carriage in one direction is effected by a spring 18 acting in opposition to the cam, but the cam may be considered as in effect the means for driving or actuating the carriage. The worm gearing is a form of slow-motion gearing designed to transmit motion from the recipient at greatly reduced speed and with substantial uniformity.

Another carriage or arm 19 is mounted on or connected with the carriage 9, so as to be movable with said carriage and to be capable also of another movement, more specifically and advantageously a pivotal movement, the effect of which at the torch-nozzle 20 is a substantially vertical or raising movement, that is to say, a movement more or less at right angles to the movement of the carriage 9. The said arm is pivoted on the center 16 and is actuated so as to swing on said center slowly and over a short range. For this purpose a rotary cam 21 is mounted on the carriage 9 and is driven from the shaft 16 by gears 22. The cam 21 coacts with a roller 23 on a bracket 24 secured to the arm 19, and in conjunction with a spring 25 produces the desired movement of this arm or carriage.

Another arm 26 is carried by a forwardly projected center or pivot 27 on the arm 19. This arm is a carriage or movable element by means of which the jets of the nozzle 20, which projects forward a short distance beyond the line of the axis of the center 27, to which the nozzle is substantially radial, are turned on a short radius in the general plane of the jets and in the same plane as the movements produced by the cams.

The arm 26 is extended rearwardly for convenient attachment of a customary form of cutting torch 28, the body of which is held in a holder 29 on the arm, but it will be understood that the machine could be equipped with a special form of torch or jet-delivering means. The nozzle is to be considered as being carried by and rotatable about or with the center 27, the projection of the nozzle beyond the axis of the center representing the arm or radius of this movement.

The pivot 27 to which the arm 26 is secured is rotated from the shaft or center 16 by a train of gears 30, though other mechanism could be employed for this purpose.

The center 27 is so carried as to operate close to the entrant contour of the rail or other shape and it is very desirable that it actually enter within the contour as shown in Figs. 1 and 6. This center is caused to move in a path of irregularly changing direction which bears a relation to the contour to be operated upon, and the nozzle 20 is also turned advancingly about the center. Fig. 6 illustrates successive positions of the center and nozzle. The jets first attack the edge of the base flange of the rail, and when the cut is started the center and the nozzle are moved inward by the action of the cam 15 on the carriage 9. At the same time the nozzle is being turned slowly upward, lowering the angle of the jets in relation to the sloping top surface of the rail flange and causing them to rise somewhat. In this way the entire base of the rail, including the flanges at both sides thereof, is cut through. The cam 21 also acts upon the carriage 19, and its action combined with the turning of the nozzle about the center 27 causes the nozzle to rise comparatively rapidly across the thin web of the rail, cutting through this part. By the time the upper part of the web is reached the nozzle has been turned forwardly to an advantageous angle for commencing the cut through the far side of the ball of the rail, and as the nozzle continues to be turned upward about the center 27, the oxygen jet cuts progressively through the far side, the middle, and the near side of the ball, completing the severance. During a substantial period of this part of the operation the cam 15 controlling the in and out motion and the cam 21 controlling the elevating motion are preferably on dwells, so that practically the only movement is then the slow turning and advancing movement of the jets about the center 27, the automatic reduction in the speed of displacement of the jets insuring that the thickness of metal in the ball will be properly cut. Toward the end of the operation, the cam 15 preferably causes the center 27 and the nozzle to back away from the work somewhat, so that the extremity of the nozzle is carried outward under the overhang of the ball. The specific motions may be varied, however, depending upon the number of successively movable carriages or parts which are employed, and which need not in all instances be three, the centers selected, and the specific nature of the actuating mechanisms or means employed, as to which there may be a good deal of variation. It is mechanically convenient and advantageous to turn the torch nozzle by constantly operating gearing, but cams might be employed throughout, or certain kinds of gearing might be used in place of the cams shown.

The cam or actuating member 21 is removable and interchangeable with cams of appropriate contours for different sizes of rails. The cam 15 is also changeable, and the ratio of the gearing 31 could also be changed. One and the same machine may thus be adapted for cutting rails or shapes of different sizes, contours and sections, or, of course, separate machines may be designed for cutting different shapes.

It will, therefore, be understood that the invention is not limited to details, nor to the particular use illustrated. The machine is particularly designed and adapted for cutting entrant shapes, but the principles of construction and operation may be applied to contours which are not entrant. By the use of a welding torch and appropriate modification of the design the invention may be applied to special welding operations.

While the invention is illustrated in the embodiment of a machine, wherein the several mechanisms are actuated mechanically or automatically by operating a single recipient, certain of the features of the invention are susceptible of embodiment in a hand apparatus wherein different movements might be under separate hand controls.

Terms of orientation used herein are relative. The machine shown is designed for the cutting of rails in situ, but it is equally applicable to the cutting of rails not in place in a track, and in that case, or when the invention is applied to cutting other shapes, it would obviously be immaterial whether the work stood upright with the apparatus in the position shown, or whether the work and the apparatus were in a different position, either turned on the side or inverted.

Certain features of the invention may be used without others, and there may be numerous changes in form, proportions, details or specific operation, or by substitution of equivalents.

What we claim as new is:

1. An apparatus for cutting rails or entrant shapes, comprising a frame, a center, means carrying said center from said frame so that said center will travel in a path of irregularly changing direction appropriate to the entrant contour, jet-delivering means carried by said center, means for continuously moving said center along said path and thereby moving said jet-delivering means, and means for turning said jet-delivering means about said center in the same plane of movement.

2. A machine for cutting rails or entrant shapes, comprising a frame, a center, means carrying said center from said frame so that said center will travel in a path of irregularly changing direction, jet-delivering means carried by said center, mechanism for moving said center along said path and thereby moving said jet-delivering means, mechanism for turning said jet-delivering means about said center in the same plane of movement, and means for actuating said mechanisms from a common recipient.

3. A machine for cutting rails or entrant shapes, comprising a frame, a center, means comprising successive carriages movable in different directions for carrying said center from said frame so that said center will travel in a path of irregularly changing direction, jet-delivering means carried by said center, mechanism for moving each of said carriages, mechanism for turning said jet-delivering means about said center, and means for actuating said mechanisms from a common recipient.

4. A machine for cutting rails or entrant shapes, comprising a frame, a center, means comprising successive carriages movable in different directions for carrying said center from said frame so that said center will travel in a path of irregularly changing direction, one of said carriages being a sliding carriage and the other being a pivotal carriage, jet-delivering means carried by said center, mechanism for moving each of said carriages, mechanism for turning said jet-delivering means about said center, and means for actuating said mechanisms from a common recipient.

5. A machine for cutting rails or entrant shapes, comprising a frame, a carriage slidable on the frame, a pivotal carriage connected with said slidable carriage, a center carried by said pivotal carriage, jet-delivering means carried by said center, mechanism for moving each of said carriages, mechanism for swinging said jet-delivering means about said center, and means for actuating said mechanisms from a common recipient.

6. A machine for cutting rails or entrant shapes, comprising a frame, a carriage slidable on the frame, a pivotal carriage connected with said slidable carriage, a center carried by said pivotal carriage, jet-delivering means carried by said center, a rotary cam for actuating said slidable carriage, another rotary cam for actuating said pivotal carriage, gearing for swinging set jet-delivering means about said center, and means for actuating said cams and gearing from a common recipient.

7. A machine for cutting rails or entrant shapes, comprising a frame, a carriage slidable on the frame, a pivotal carriage connected with said slidable carriage, a center carried by said pivotal carriage, jet-delivering means carried by said center, and mechanism including gearing and a plurality of rotary cams for moving said carriages and for swinging said jet-delivering means about said center.

8. A machine for cutting rails or entrant shapes, comprising a frame, a carriage slidable on the frame, a pivotal carriage connected with said slidable carriage, a center carried by said pivotal carriage, jet-delivering means carried by said center, and mechanism including gearing and a plurality of rotary cams for moving said carriages and for turning said jet-delivering means about said center.

9. A machine for cutting rails or entrant shapes, comprising a frame, a center, means carrying said center from said frame so that said center will travel in a path of irregularly changing direction, jet-delivering means carried by said center, and mechanism including a plurality of rotary cams for moving said center along said path and for turning said jet-delivering means about said center.

10. An apparatus for cutting rails or entrant shapes, comprising a frame, jet-delivering means, means comprising successive relatively movable parts carrying said jet-delivering means from said frame so that the jets will move inward over a flange of the shape and away from said flange as well as turningly on a short radius, and means for thus moving said jet-delivering means in a continuous manner.

11. A machine for cutting rails or entrant shapes, comprising a frame, jet-delivering means, means comprising successive relatively movable parts carrying said jet-delivering means from said frame so that the jets will move inward over a flange of the shape and away from said flange as well as turningly on a short radius, and mechanism including a plurality of rotary cams for moving said jet-delivering means.

12. A machine for cutting rails or entrant shapes, comprising a frame, jet-delivering means, means comprising successive relatively movable parts carrying said jet-delivering means from said frame so that the jets will move inward over a flange of the shape and away from said flange as well as turningly on a short radius, and mechanism comprising a plurality of rotary cams and gearing operated from a common recipient for moving said jet-delivering means.

13. A machine of the character described comprising a frame, a carriage slidable in and out on the frame, a cam for actuating said carriage, a carriage pivoted on said sliding carriage, a cam on said slidable carriage for actuating said pivoted carriage, a torch-holder arm pivoted on said pivoted carriage, gearing on said pivoted carriage for actuating said torch-holder arm, and a primary operating shaft and slot-motion gearing operated thereby for actuating said cams and gearing.

14. An apparatus for cutting rails or entrant shapes, comprising a frame, a carriage movable in and out with reference to the entrant contour, jet-delivering means carried by said carriage and turnable relatively thereto, means for operating said carriage, and means for turning said jet-delivering means, so as to move the jets in continuous manner.

15. A machine for cutting rails or entrant shapes comprising a frame, successive carriages mounted on said frame for movement in two directions respectively, jet-delivering means mounted on one of said carriages for turning movement in the same plane, and mechanism for operating each of said carriages and for turning the jet-delivering means in order to move the jets in a continuous manner.

16. A machine for moving and guiding torch jets over irregular contours, comprising a frame, jet-delivering means, means carrying said jet-delivering means from said frame for guided motion substantially in the plane of the jets in a path of irregularly changing direction appropriate to the contour or section to be operated upon, and means for propelling the jets, said propelling means including a plurality of changeable parts controlling different elements of the path of motion of the jets mechanically.

17. A machine for moving and guiding torch jets over irregular contours, comprising a frame, jet-delivering means, means carrying said jet-delivering means from said frame for guided motion substantially in the plane of the jets in a path of irregularly changing direction appropriate to the contour or section to be operated upon, and means for propelling the jets, said propelling means including one or more changeable rotary cams controlling different elements of the path of motion of the jets.

JOHN J. CROWE.
JOHN H. W. BEGEROW.